United States Patent [19]

Broadhurst et al.

[11] Patent Number: 4,558,223

[45] Date of Patent: Dec. 10, 1985

[54] ELECTRONIC X-RAY RECORDING

[75] Inventors: John H. Broadhurst, Golden Valley; Marvin B. Bacaner, Minneapolis, both of Minn.

[73] Assignee: Sysmed, Inc., Eden Prairie, Minn.

[21] Appl. No.: 345,940

[22] Filed: Feb. 5, 1982

Related U.S. Application Data

[63] Continuation-in-part of Ser. No. 239,313, Mar. 2, 1981.

[51] Int. Cl.[4] .............. G01T 1/18

[52] U.S. Cl. .............. 250/374; 250/385

[58] Field of Search .............. 250/374, 375, 385

[56] References Cited

U.S. PATENT DOCUMENTS 4,047,039 9/1977 Houston .............. 250/385

4,075,492 2/1978 Boyd et al. .............. 250/385 X

*Primary Examiner*—Janice A. Howell

*Attorney, Agent, or Firm*—Kinney & Lange

[57] ABSTRACT

A method for increasing the efficiency of gas ionization detectors for diagnostic x-rays by matching a detector gas absorption edge with the energy level of an x-ray source to produce photons of only slightly higher energy. Sequential x-ray images using different matched gas absorption edges and x-ray source energies allows contrast information to be obtained to distinguish calcium deposits or dye from bone, for example.

Specific ionization detectors useful for practicing the inventive methods are also described. One such detector uses ultrafast electronics associated with individual wires of a multiwire two dimensional proportional counter.

Another detector employs a conductor backed sheet of insulating material to immobilize positive gas ions in a density distribution conforming to the x-ray image. The density distribution may subsequently be read out by electromechanical means for sensing the potential differences on the sheet. The potential sensing means may be located within or outside the detector chamber.

41 Claims, 14 Drawing Figures

ELECTRONIC X-RAY RECORDING

DESCRIPTION

1. Background of the Invention

Figure 1:
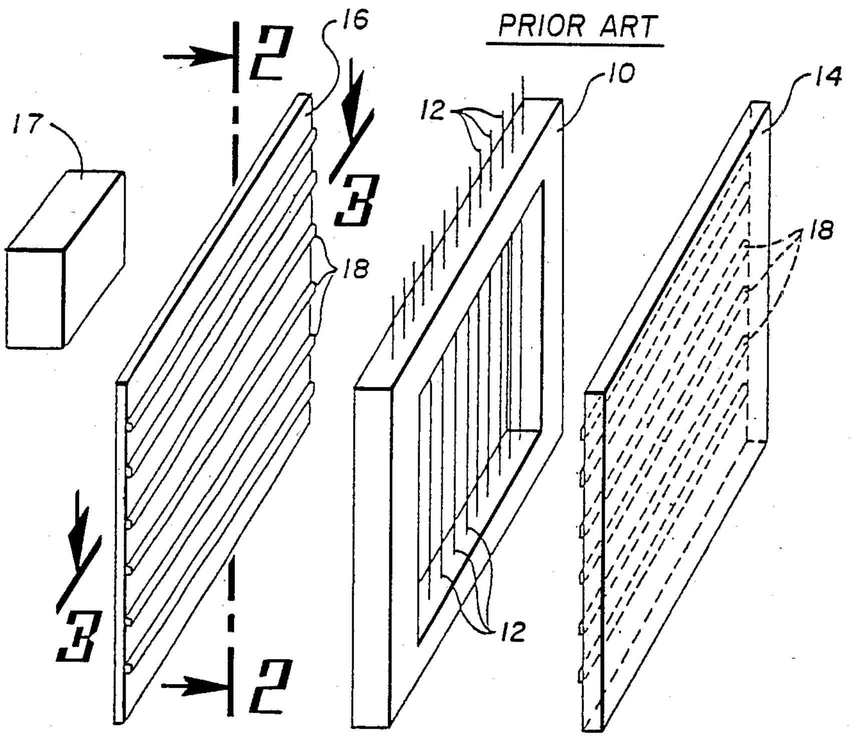
Fig. 1 PRIOR ART

This is a continuation-in-part application of copending patent application Ser. No. 239,313, filed Mar. 2, 1981, entitled ELECTRONIC X-RAY RECORDING.

This invention relates to electronic means for recording x-ray shadowgrams. A shadowgram is defined as a two-dimensional spatial picture of the shadow, i.e., the absorption of x-rays by some object placed between an x-ray source and the recording system.

Since the discovery of x-rays at the end of the 19th century, there have only been two principal methods available for recording x-ray shadowgrams in medical applications. These two methods are fluoroscopy, in which the x-rays strike selected chemical compounds causing them to emit visible light, and photography, in which x-rays directly interact with grains of silver halide in a photographic emulsion rendering them developable.

For the last 40 years, the principal tool for xray generation for medical x-ray diagnosis has been the hot cathode-tungsten anode x-ray tube. Refinements have been made, such as rotating anodes, which increase the intensity of the x-ray flux available and thereby reduce exposure times. However, due to the low sensitivity of photographic and fluoroscopic materials and their lack of differentiation of response to x-ray photons of different energies, little work has been done on materially different x-ray tube sources.

In contrast to the low sensitivity of photographic and fluoroscopic methods, ionization detectors are very sensitive at x-ray energy levels. When the energy of an x-ray photon is the same as the energy required just to eject one of the electrons from an atom of the gas, then the gas becomes strongly absorbing, i.e., the x-ray photon energy is equal to an absorption edge energy of the gas. Photons having an energy below the absorption edge of the gas are absorbed weakly and, therefore, are not detected. Photons having an energy above the absorption edge of the gas emit secondary photons, as well as electrons, upon collision with a gas atom. If the incoming x-ray photon is of sufficiently high energy, the secondary photon may itself be absorbed and cause electron emission, possible from a different level. Electrons produced by secondary photons degrade x-ray images, and specialized techniques must be used to reduce their effect.

Electronic detectors utilizing gas ionization chambers have been used with x-ray beams in CAT scanning devices, but these devices are extremely expensive and cannot be considered as a practical substitute for the ordinary two-dimensional shadowgram. Ionization chamber detectors based on multi-wire proportional counters have also been described for gamma ray and nuclear particle detection and have been used in other applications as x-ray detectors. These latter detectors, however, if used to obtain x-ray shadowgrams, would require x-ray exposure periods on the order of fractions of a minute because the electronic read-out time is substantial. Over-exposure of the patient can be avoided by reducing the intensity of the x-ray flux, but practical limits on the time a patient may remain free of voluntary and involuntary movement dictate that the exposure time be only a few seconds at most. Ideally, exposure time would be significantly less than one second so that heart movement could be frozen.

BRIEF DESCRIPTION OF THE INVENTION

The present invention provides a method and structure which will permit the formation of x-ray shadowgram images of a quality comparable to that of photographic or fluoroscopic techniques while, at the same time, reducing patient exposure to harmful high energy xray radiation. The method is a technique for optimizing the efficiency of position sensitive ionization detectors. Ionization detector structures which make routine diagnostic shadowgrams practical by acquiring image information with an exposure of only fractions of a second are also part of the present invention.

Ionization detectors employing high electric field gradients, such as those employing a fine wire positive electrode, have the advantage that an electron released from a gas atom by an x-ray photon, once in the vicinity of the wire electrode, is strongly accelerated. This high energy electron collides with other gas atoms and ionizes them, thereby creating a shower of electrons and positively charged gas ions. The path of the electrons ends at the wire, whereas the positive ions return to the negative electrode. This charge multiplication characteristic makes it much easier to detect single x-ray photons and thereby offers the potential of providing the same information as that of conventional photographic or fluoroscopic techniques while maintaining patient exposure at a much lower level.

One aspect of the present invention is a method of maximizing the efficiency of the x-ray ionization detectors by matching the detector absorbing gas and x-ray source so that the energy level of the x-rays emitted by the source is just above the absorption edge of the gas. This keeps patient exposure to a minimum while achieving optimal detector efficiency. Furthermore, the problem of secondary photon emission causing false images is minimized, any secondary photons emitted having too low an energy to be strongly absorbed by the detector gas. This method of matching the detector gas and the x-ray source, in addition to lowering patient dosage by maximizing the efficiency of the detector, also permits lower patient exposures by use of lower energy x-rays for images of the patient's thinner extremities where body absorption of lower energy radiation is insufficient to seriously reduce the radiation flux reaching the detector.

A variation of the inventive method involves providing two or more matched gas/source combinations so that successive images obtained from x-rays of different energy levels can be compared to enhance contrast, as for instance, between bone and soft tissue. It is also possible to differentiate by this means between bone and either dye or calcium deposits. By employing subtractive techniques on images from two energy levels, it is possible to produce a deep body image of soft tissue in which the interfering bone structure can be significantly suppressed, if not eliminated. Of particular utility would be the production of images of the thorax (heart, lungs and medial stinum) with minimal obstruction of ribs and vertabrae. This type of image could reduce the need of multiple x-ray views (i.e., lateral and oblique) when trying to detect soft tissue abnormalities.

Several different two-dimensional ionization detectors have also been invented to solve the problem of slow image read-out which has heretofore prevented practical application of ionization detectors to produc- Although detection efficiency increases with increased concentration of gas atoms, it is not necessary to change detector gases between exposures when employing the method of comparing images obtained from different energy levels. If one is willing to operate the detector at higher pressure or to sacrifice some detector efficiency, mixtures of ionizing gases may be used. Alternatively, two absorption edges of a single gas, e.g. the k and l edges of Xenon, may be used in some applications.

When using mixed gases, the respective concentrations can be adjustd so that their absorption is approximately equal at the two x-ray energies of the target gases. In the case of Xenon and Krypton, the Krypton concentration need only be about 10% of the total gas concentration.

To change x-ray sources, it is contemplated that a x-ray tube would be provided with a turret target having a mechanical rotation device to facilitate rapid charging of x-ray sources. Other means for changing energies may also be employed including demountable tubes or a plurality of different x-ray tubes which may be successively directed at the subject.

It is most preferred that the method of the present invention be employed with one of the ionization detectors described hereinafter. In different ways, each of these detectors permits an electronic image to be obtained while exposing the patient to the x-ray source for a minimal length of time.

Multi-Wire Proportional Counter with Ultrafast Electronic Read-out

Two dimensional x-ray detectors of the proportional counter type have, in the past, used either a continuous position sensing element (for example, a long wire) or a two-dimensional matrix. Such counters are economical to realize, but have the basic defect that only one measurement can be made within the counter resolving time over the whole area of the counter. This restriction makes its application to medical radiography impractical as the needed exposure times to produce an x-ray image are unreasonably long.

A prior art two-dimensional type matrix type counter is shown in FIG. 1. An ionization chamber is constructed using a frame of insulating material 10 across which is strung a set of closely spaced fine wires 12. This chamber is closed and made gas tight by two plates 14 and 16 made of insulating material and carrying on their inner side a closely spaced array of conducting strips 18. One of these plates, 16, is made thin in order to permit x-rays (originating from a source shown generally as box 17) to enter the chamber. In operation, this counter is filled with gas, usually at high pressure, and a positive potential applied to wires 12.

Figure 3:
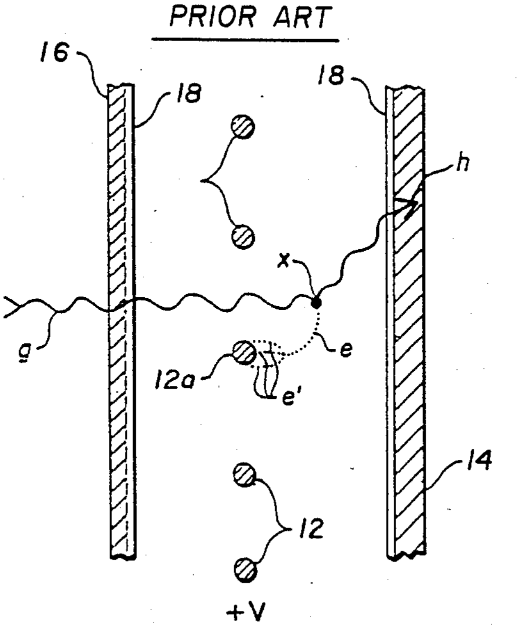
Fig. 3 PRIOR ART
Figure 2:
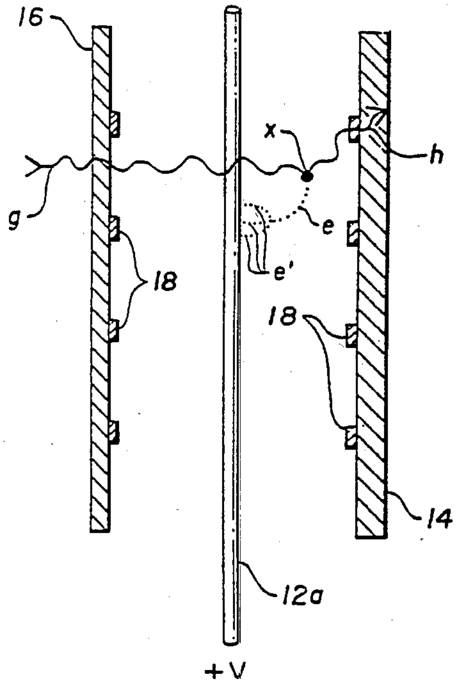
Fig. 2 PRIOR ART

Incoming x-rays cause a sequence of events to occur, as is shown in FIGS. 2 and 3. Incoming x-ray g interacts at point x with an atom of the counter gas filling, releasing a free electron e and possible a further photon h of reduced energy. The free electron is attracted to the nearest wire 12*a* by the positive potential applied and on its way, in the vicinity of the wire, creates a shower of further electrons e′ by collision ionization processes. The electrical outcome of this process is a pulse of current on wire 12*a* and on the metal strip 18 opposite the location of the event. These two pulses provide the electronic information of the X, Y location of the x-ray event, and can then be processed by standard digital electronics.

Figure 4:
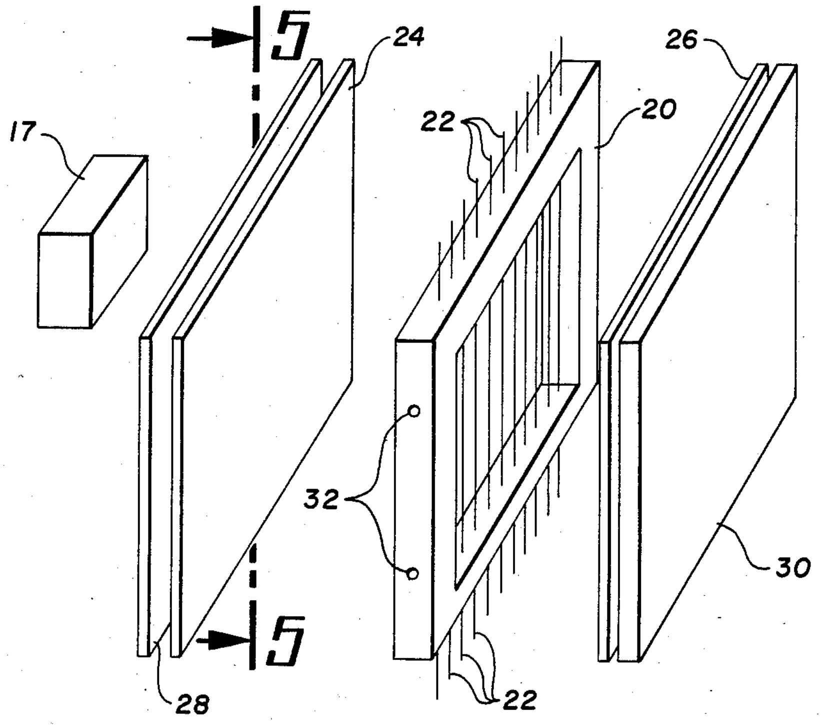
Figure 5:
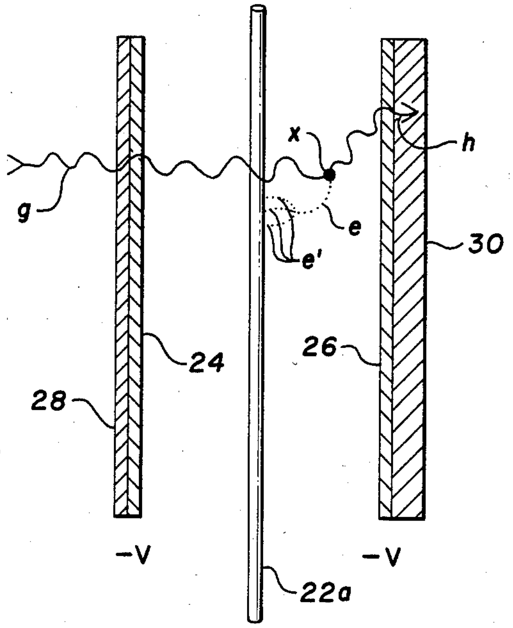

FIG. 4 shows the inventive multi-wire detector used to record x-ray information in this application. As before, in an insulating frame 20 a set of fine (25 micron) conductors 22 are strung at 1 mm intervals. These spacings of the closely spaced conductors are intended to be illustrative of the best mode known to the inventors, for example, a 2 mm spacing could also provide suitable results. In this case, however, the "wire" is made of a highly resistive material, namely, a carbon film deposited on a quartz core. Electrically completing the counter are two sheets of aluminized Mylar (a polyester film marketed by DuPont) 24, 26 which are assembled with their conducting sides toward the wires and mechanical end plates 28 and 30 which render the chamber gas-tight. Plate 28 is made thin to allow the unrestricted entry of x-rays, while plate 30 is thick to absorb x-rays which have failed to interact in the counter. Holes 32 admit gas to the counter, in this case Xenon, at a pressure of 3 atmospheres together with a 1 percent addition of "Freon 13B1."

The operatin of this chamber is identical to that of the prior art in that an incoming x-ray produces an electron e which flows at a given location to the nearest wire, being repelled from the Mylar sheets 24, 26 by virtue of a negative potential placed on them. As before, close to the wire 22*a* the electron generates a cloud of electrons e′ and ions due to collision ionization. This process is effective instantaneously, taking 10–11 seconds or less, and results electrically in a charge being placed instantaneously at a given point on the wires 22*a*.

This charge is not, however, able to flow away instantaneously to the wire ends, as the wire resistance, together with the capacitance between the wire and the aluminized Mylar plates, forms a distributed RC time constant. The RC product will be proportional to the distance of the event from each end of the wire. Determination of those time constants will, therefore, determine one coordinate of the event, the other being determined by the physical location of the wire.

It should be noted that, providing independent event processing is available for each wire, the data acquisition rate is now determined by the time to process N events simultaneously, where N is the number of wires in the counter (in the first realization 256). Assuming each position on the wire must process an average of 500 events and, for symmetry, the wire is divided into 256 distinct cells, then the acquisition time is $500 \times 256 \times p$, where p is the event processing time. In this realization, p is in the order of one microsecond, making the acquisition time for an x-ray image approximately 0.125 seconds.

Figure 6:
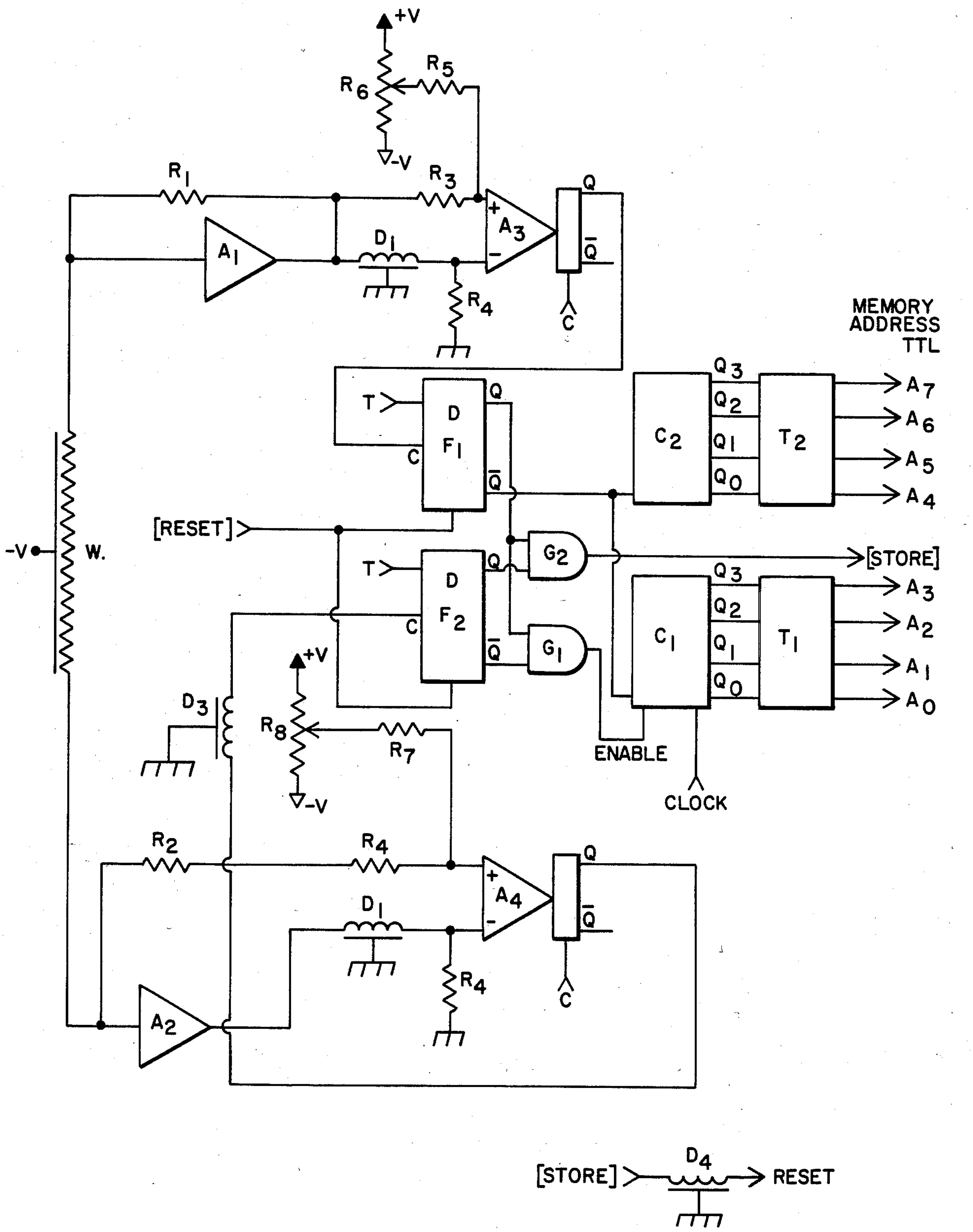

The elctronics affecting the acquisition of position information is shown in FIG. 6. Two high speed operational amplifiers operating in inverting mode ($A_1A_2$) present to the wire W virtual grounds at their inputs. As charge flows from wire W into $A_1$ and $A_2$, a potential pulse is developed at their outputs proportional to the magnitude of the incoming charge flow, the proportionality constant being determined by $R_1$, $R_2$. This signal is transferred directly and delayed by delay lines $D_1$ $D_2$ to the inputs of differential comparators $A_3$ $A_4$. When the potential from the amplifiers $A_1$ $A_2$ is increasing, the direct signal to the comparator will be larger (more positive) than the delayed signal. When the majority of the charge has been collected, the amplifier signal will decrease, and the delayed signal will be larger than the direct signal. The comparator will thus become true for the time taken for the amplifier signal to reach its peak value and start to decline again, thus measuring the "rise time" of the signal at each end of the wire.

These signals are converted to digital information by an 8-bit counter $C_1$, $C_2$ which is clocked by an external 325 MHz signal. When comparator $A_3$ has gone true and returned to false, D type flip flop $F_1$ will be set. The NAND gate $G_1$ will, therefore, be satisfied, its enable will be low and the counter will start counting. Similarly, when $A_4$ comparator goes through a false true false cycle, D type flip flop $F_2$ will set, thus terminating the count. Delay line $D_3$ is inserted in the signal from $A_4$ to the flip flop so that the operation of the flip flop is delayed by 128 clock cycles. This enables the counter to work in the positive integer mode. When flip flop $F_2$ is set, the AND gate $G_2$ is satisfied and the signal STORE becomes true. At this point, the counter information is transferred through level translators $T_1$, $T_2$, thus releasing the analysis for another event.

The latched information from $T_1$ $T_2$ is then processed by normal digital techniques (not shown). Associated with each wire is memory of capacity 256 words of 12 bits. Each STORE request results in a read, add one, replace (RAO) cycle being executed at the address determined by the latched values of $A_0$ through $A_7$.

This memory which totals 64 K words is also organized on normal data bus techniques to be part of the memory space of the associated computer and also to refresh the memory of the video display. It should be noted that each wire of the counter corresponds to one line of information of the video display, hence a minimal processing is needed to initially display the acquired image.

Components which may be used in the circuitry of FIG. 6 are as follows:

- $A_1$, $A_2$ Fairchild A 715 or equivalent (amplifier)
- $A_3$, $A_4$ Motorola MC 1650 or equivalent (comparator)
- $D_1$, $D_2$ Bel Fuse 100 100 or equivalent (delay line)
- $C_1$ Motorola MC 1654 or equivalent (4-bit binary counter)
- $C_2$ Motorola MC 10136 or equivalent (4-bit binary counter)

As a total of $256 \times 256 \times 500 = 32 \times 10^7$ photons are required to form an image in the embodiment discussed above, the total photon flux into the counter must be $2.56 \times 10^9$ photons per second for 100 percent counter efficiency. As the calculated counter efficiency is 5 percent, the required flux is $5.12 \times 10^{10}$ photons per second. The x-ray tube intensity requirements are, therefore, minimal.

A conventional pierce electron gun system using an air cooled anode may be employed. The preferred anode materials are, however, unique being a pellet of Praesodymium or Yttrium imbedded in a carbon block. These materials are chosen as they produce fluorescent k x-rays of energy just above the required k absorption edge energy of Xenon and Krypton, respectively, the preferred chamber gas fillings. Usual filtering is employed to minimize the white background radiation.

As previously described, the multi-wire detector of the present invention may be used to obtain contrasting images by making successive exposures with different source/detector gas combinations. To do so, however, will normally require doubling of the initial memory capability because the second exposure will be most advantageously made before the data from the initial exposure can be processed into a composite image.

ELECTRO-MECHANICAL X-RAY IMAGE CHAMBER

The ionization chamber used in this embodiment is shown in FIG. 7. It consists of a frame 40 supporting taut closely strung wires 42. Wires 42 are typically 2 mil gold plated Tungsten strung at 10 mil intervals. On one side of this frame is a sheet of metal backed insulating material 44 which is typically copper-backed Mylar. Sheet 44 is separated from the wires by a small space, typically 0.5 inches. The whole assembly is mounted in a gas-tight container comprising rigid back plate 50, thin window 52 and gas retaining enclosing walls (not shown). The wire frame/insulating sheet assembly must remain in mechanical alignment without distortion during pressurization of the chamber and, for this reason, this assembly is not attached rigidly to the container.

Within the container and resting normally below the wire frame/insulating sheet assembly is a bar 56 mounted on guides 58 and 60, as shown in FIG. 8. Bar 56 may be mechanically moved along guides 58 and 60 by means of drive cable 62. Although not shown in FIG. 7, guides 58 and 60 and drive cable 62 extend upwardly between the wire frame 40 and plate 44. The thickness of bar 56 is such that it will pass between the wires and the insulating plate 44.

The ionization chamber is filled with a suitable gas (typically Xenon) under pressure, to which may be added a stabilizing agent, such as Freon 13B1 (the combination being known in the literature as "magic gas"). The choice of front window thickness and gas pressure is chosen in order to minimize the fraction of x-ray photons absorbed in the window and to maximize the fraction absorbed in the Xenon gas filling.

In recording the x-rays, a high positive potential (typically plus 2000 V) is applied to the wires 42 with respect to the conductive rear surface of plate 44. In this embodiment, the wires are not insulated from each other and are, therefore, energized together. When x-ray photons are passed through window 52 into the detector chamber, ions and electrons are formed as previously described. The electrons are attracted to the wire, while the positive gas ions (Xenon) are attracted to the plate. As before, in the vicinity of the wire the high local electric field causes the incoming electrons to produce more electron ion pairs by collision with the gas atoms. Typcially, each arriving electron generates 1-10,000 further pairs. The positive gas ions are repelled from the wire to the plate where they come to rest on the surface of the insulating layer of plate 44. Due to the insulating properties of this layer, these ions are immobilized at their landing site and, therefore, remain as a density distribution which reflects the x-ray intensity distribution, i.e., the x-ray image desired.

The ion density distribution is read out by means of bar 56. On the face of bar 56 is a close packed line of plates 66, each plate being insulated from its neighbors. Each plate, therefore, interrogates one line element of the insulated sheet 44. In a typical embodiment, each plate 66 is about 25 mils square and is held by bar 56 about 10 mils from the insulator surface of plate 44.

Insulated plates 66 are each connected on the interior side, that is, the side remote from the insulating surface of sheet 44, to a current to voltage amplifier. Alternatively, the interior sides of plates 66 form a set of contacts which connect to a group of current to voltage amplifiers which are guided down the bar. In principle, and in fact, this operation is similar to the beam and carriage operation of an X-Y recorder. The output of these amplifiers is transferred by flexible leads to connections passing through the pressure vessel.

A drive motor (not shown), associated with drive cable 62, causes the bar to traverse the insulator surface.

In order to sense the vertical position of the bar, a displacement transducer (typically a linear potentiometer) is mounted along side bar guide 60.

Underneath bar 56 a slit cylindrical tube 70, containing a sharp-edged electrode 74, is mounted. The function of this device is to establish a uniform charge on the insulating surface of sheet 44 prior to x-ray exposure.

To read out the x-ray image created by the ion density distribution on insulating sheet 44, the high potential on wires 42 is removed and bar 56 is traversed at constant speed over the insulting surface. As the sensing capacitance plates 66 scan the surface of sheet 44, displacement currents flow as the charge shares between the capacitance formed by the sheet 44 surface to its metallic backing and the capacitance formed by the sheet 44 surface to the sensing electrode or plates 66. These currents, which are the differential of the charge pattern of the plate, are converted to potentials and led out of the chamber.

In the most luxurious realization of this detector, each pick-up plate 66 has its own amplifier, and an on-bar multiplexer enables all line images to be read out in one pass. In a more economical realization, a group of amplifiers is mechanically switched to a group of pick-up plates, and several passes are made over the insulating surface. These details, however, merely affect the speed of the read-out.

When the read-out is finished, a high potential is applied from a constant current supply to the sharpedged electrode 74, establishing a steady corona discharge between it and the surrounding tube 70. This discharge causes a conducting plasma to protrude from the tube slit 78 and contact the insulating surface of sheet 44. If this discharge is now traversed over the insulating layer of sheet 44 by moving bar 66, ions or electrons will land on it preferentially until the insulator surface is at plasma potential. In this manner, a uniform nearly zero charge is deposited on the insulator before commencing the next x-ray exposure.

In practice, the insulating sheet 44 may not be discharged evenly, and the gains and offsets of the amplifiers for the individual plates 65 may not be matched. This is overcome by reading first a discharged surface and then a surface after a uniform x-ray exposure. The value so obtained need not be retained by the associated computer and memory, but can be written out onto mass storage for later use as normalizing parameters. In this matter, systematic noise can be removed by renormalization of the data after recording.

The correct "exposure" can be obtained by integrating the displacement current to the metallic backing of the sheet 44 during the time the x-ray tube is emitting. This feature can be used to automatically control the x-ray flux to ensure an acceptabe image with a minimal patient dose.

For a 0.062 inch Mylar sheet 44, an ion pair multiplication ratio of 10,000 at the wire will ensure that 500 detected photons will produce a surface potential of 60 volts. At this potential, the uncertainty fluctuation noise of the photons (about 500 to the 1/2 power) is greater than the electrical current noise of normal 741 series operational amplifiers when operated at a band width determined as follows. Assuming an $11\times16$ inch insulating sheet read in a 16-inch direction and with maximum television resolution, i.e., 512 elements in the 11-inch and 768 in the 16-inch direction, the reading time will be $512\times768\times100\times10^{-6}=40$ seconds, if a normal 8-bit successive approximation ADC of 100 microseconds conversion time is used and all pick-up plates are read at one passage. During this time, any individual line is read 768 times, i.e., at 20 times a second. A band width of 100 Hz is, therefore, adequate to ensure settling to 2 percent accuracy between the readings. The reading speed limit is probably in the order of one second, assuming a typical slew rate for the bar of 20 inches per second. This would involve a 2.5 microsecond conversion rate and a current to voltage amplifier band width of about 2000 Hz, both of which are easily within the reach of modest electronics.

Figure 10:
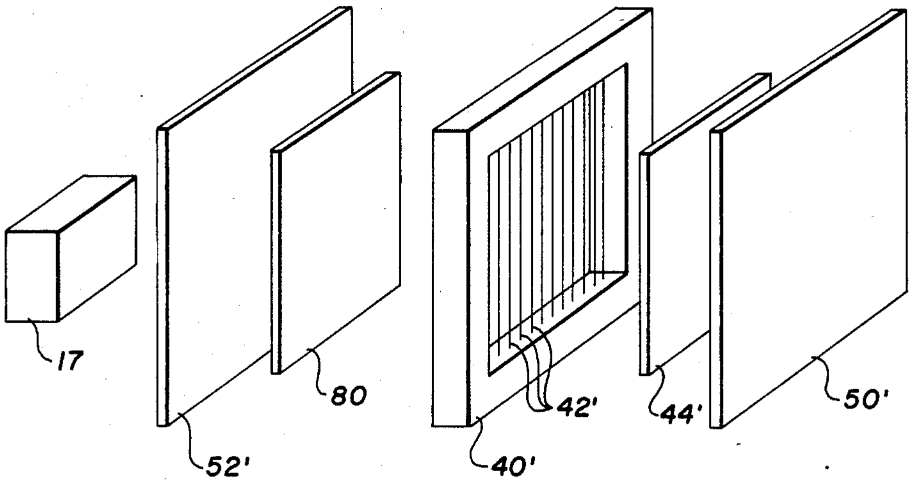

If a contrast image, obtained by comparing two images obtained from x-rays of different energy levels, is desired, the chamber of this embodiment may be constructed using two insulating sheet read-out bar assemblies. The second metallic backed insulating sheet 80 shown in FIG. 10 is placed between the chamber window 52' and the wire frame 40. Likewise, a second read-out beam and guide bar assembly, as shown in FIG. 8, is placed between sheet 80 and frame 40'. To expose sheet 44', sheet 44' is grounded, while sheet 80 is maintained at a potential of the wires 42'. The positive ions formed in the vicinity of wires 42', when the x-rays enter the chamber, are attracted to sheet 44' and repelled from sheet 80. To obtain an image on sheet 80, the potential difference between the metallized surfaces of sheets 44' and 80' is reversed. That is, the metallic surface of sheet 80 is grounded, whereas the metallic surface of sheet 44' is maintained at the wire potential.

This double insulating sheet/read-out bar structure permits recording of two x-ray images, closely spaced in time, for subsequent processing for contrast information as previously described.

Portable Cassette Form of Electro-Mechanical X-ray Imaging Chamber

The portable cassette described in this section is an alternate embodiment of the electro-mechanical image chamber just described. This embodiment is a transportable cassette which can replace film x-rays almost completely as the recording device has no electrical connections or other encumbrances. It may be extended to dental and industrial applications. The image recording chamber is separate from the image reading machine, thus permitting a reading machine to be shared over multiple cassettes.

Figure 11:
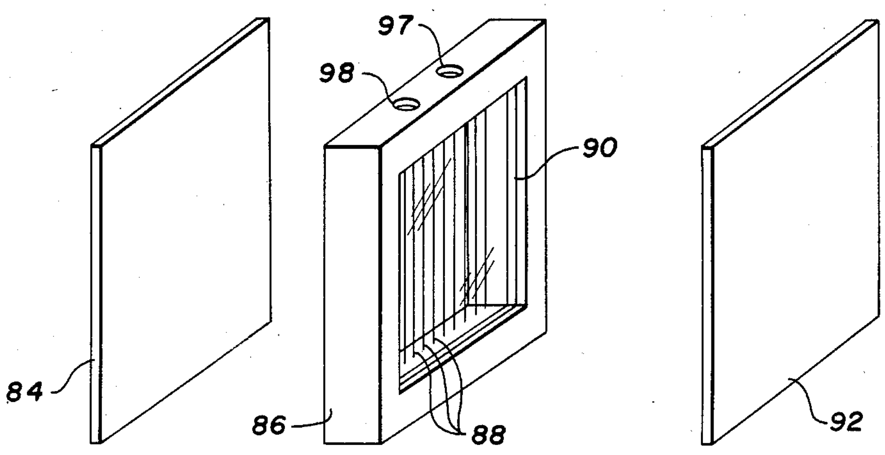
Figure 12:
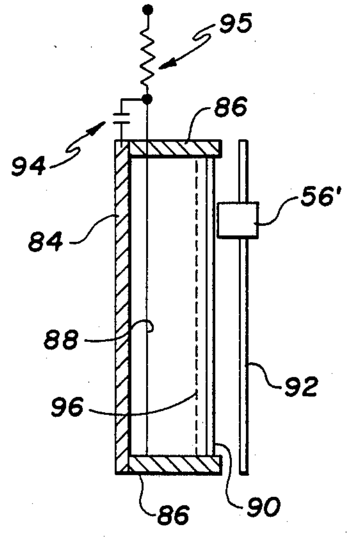

The basic construction of the cassette is shown in FIG. 11. It consists of an enclosed gas-tight metal box having a metal front window 84, a frame 86 comprising side walls of the chamber, a grid or harp of fine wires 88 carried on the frame and an insulating rear window 90 transparent to ultraviolet light. The wire grid is insulated from the box and provided for the connection to the outside. In normal use, a metallic back cover 92 is secured to the back of the box in order to provide protection for the rear window and to insure that the box is completely electrically conducting on the outer surface. The gas in this chamber, however, is retained by the transparent window, not the back cover. A high quality capacitor 94 (polystyrene or similar dielectric), shown schematically in FIG. 12, is connected between the wire grid and the outer ground potential surface of the box.

To operate this chamber, the back cover is attached by any suitable means, and a high voltage power supply is connected through a high impedance, such as 1 Megohm resistor 95 to the wire grid, and the high quality capacitor charged. The high impedance provides both safety for the operator and prevents large currents from flowing. The power supply is then disconnected. The cassette is then ready for use. A polystyrene capacitor has a leakage time of approximately 50 years, so the wire grid will remain charged to operating potential for an extended period.

The cassette is exposed in the same manner as a film x-ray cassette, i.e., placed behind the subject being x-rayed. The electrical function is the same as described previously, the x-rays producing electrons, multiplication taking place near to the wires and positively charged ions accumulating on the inside surface of the transparent insulating sheet 90 where they are immobilized. Because the front window 84 is maintained at the same potential, i.e., ground potential, as the insulating sheet 90, it is preferred that the wire grid be as close to window 84 as possible without causing arcing between the grid and window 84. The potential on the grid typically will be on the order of 2 kilovolts. Moving the wire grid closer to front window 84 than to rear window 90 results in most photon-gas atom collisions occurring behind the wire mesh so that the positive ions resulting therefrom migrate toward insulating sheet 90, rather than toward metal front window 84.

The cassette is read out by removing the back cover 92 and placing the cassette with the exposed insulating plate over read-out bar equipment similar to that shown in FIG. 8. The read-out equipment contains a movable read-out bar 56' essentially identical to bar 56 described in FIG. 8. However, this equipment does not have the corona discharge tube 70, shown in FIG. 8. Bar 56' traverses in close proximity to the outer surface of the insulating sheet and reads the displacement currents flowing to a row of sensors in a manner similar to that described for the electro-mechanical chamber.

Once read-out is complete, the high voltage on the wire grid is removed by discharging the storage capacitor through the high impedance, and ultraviolet light is projected through the transparent insulating window 90. This light produces photoelectrons which are attracted to the positively charged ions immobilized by the inner surface of window 90 and continues to neutralize them until the inner surface is uniformly charged slightly negative, thus preventing further electrons from landing.

The removable back is then reattached, the wire grid recharged and the cassette is again ready for use.

A suitable material for the insulating is quartz, as this is both of high resistivity and transparent to ultraviolet light. However, materials satisfying both criteria may also be used. Since the read-out equipment must sense the capacitance differentials, through the thickness of window 90, this window must be maintained at a minimum thickness, preferably about 10 mils or less.

The wire harp is preferably supported from the side of the enclosure by polystyrene insulators, not shown, as it is necessary to minimize leakage.

At present, the absence of a backing plate in front of insulating sheet 90, i.e., inside the chamber, reduces the available signal currents by an estimated factor of 10. Because of this, it may be necessary to introduce a fine mesh secondary or screen grid 96 immediately in front of the insulating plate. If this grid is introduced, it should be maintained slightly positive with respect to the insulating sheet, e.g. about 100 volts, so that the positively charged gas ions will migrate through the mesh to insulating sheet 90.

Whereas the schematic representation of capacitor $C_1$ and resistor $R_{11}$ shown in FIG. 12 shows these components on the exterior of the cassette chamber, it is contemplated that, in practice, these elements will be imbedded in the frame 86 of the cassette. A recessed access pot 97 can be used to provide means for making the necessary electrical connection to charge and discharge the capacitor.

Another access port 98 can be used to flush and fill the chamber with ionizing gas.

Figure 13:
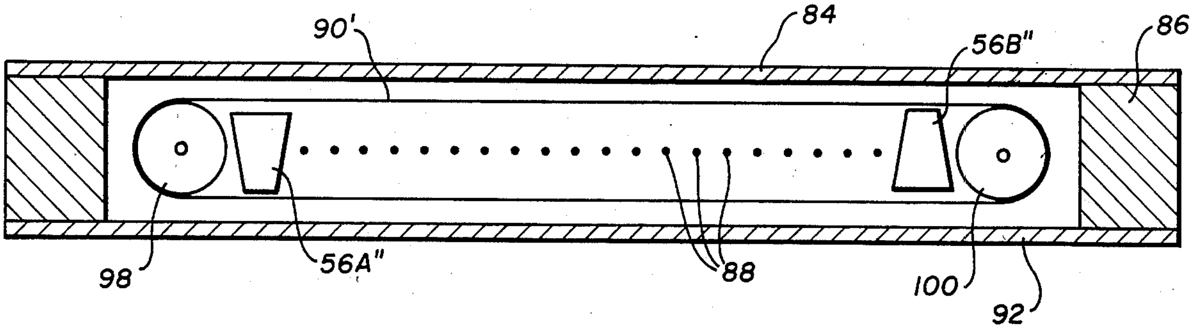

FIG. 13 shows a top cut away view of another embodiment of the detector which may be more easily read out than the detectors shown in FIGS. 7, 10 and 11. In this embodiment of the invention, the transparent insulating window is formed into a continuous belt 90' supported by rollers 98 and 100 at both sides of the window in frame 86. Belt 90' is on opposite sides of and surrounds the grid or harp of wires 88. the outside surface of belt 90' is divided into two conductive portions positioned with one on each side of grid 88 when the belt is positioned to receive an x-ray shadowgram. Rollers 98 and 100 have a conductive rubber surface which discharges any portion of the insulating surface which discharges any portion of the insulating surface of belt 90' brought into direct contact therewith.

The improved embodiment of FIG. 13 is particularly suited to take two images in close time sequence. This feature is important when it is desired to take identical views of a subject using different intensities to differentiate between bone and dye or calcium.

As was the case with the detector embodiment in FIGS. 11 and 12, the wire grid 88 is insulated from the remainder of the box and may be held at high potential by being connected to one of the conductive portions of belt 90' with a high quality capacitor 94 which has been charged through a high impedance resistor 95. The other conductive portion is connected to the box reference potential to minimize interference with the ions in the detector. The detector is then exposed by being placed behind the subject being x-rayed, and the inside dielectric surface of the lower portion of belt 90' receives the stored charge in accordance with the received radiation intensity to define an image. A second image can be placed on the outer insulating surface of the belt by establishing the grid potential with respect to the other conductive backing and exposing the detector to the x-ray source.

Figure 14:
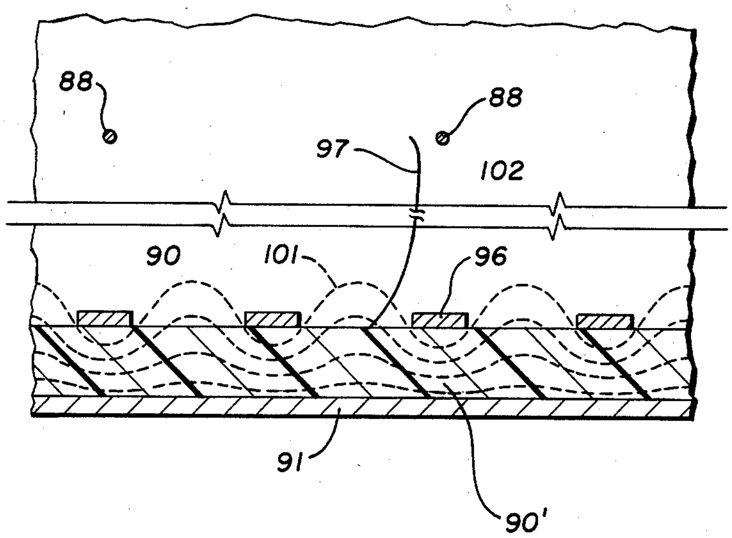

In this embodiment, the read-out of the image is accomplished by rotating the drums 98 and 100 in a clockwise manner, as viewed in FIG. 14, to move the inner surfaces of the dielectric sheet 90' past the read-out heads 56A" and 56B" which are located in the vicinity of the roller 98. The read-outs 56A" and 56B" are the equivalent of the read-outs 56 and 56' in FIGS. 8 and 12, but differ from them in that they remain fixed in a stationary manner relative to frame 86 during the entire read-out process, while the dielectric surfaces of belt 90' are transported past them by rotation of rollers 98 and 100. As the portion of the insulating surface bearing the deposited charge come into contact with the conductive surface of the nearest roller, the surface of the roller returns the dielectric surface to a nearly uncharged zero potential condition so that further images can be applied to the film as soon as it is read out.

It can be seen that both the top and bottom inner surfaces of the dielectric belt 90' can be exposed at about the same time by selectively energizing the appropriate back conductor of the dielectric as desired before the read-out is accomplished. The two inner surfaces of the belt are read out simultaneously by the detector arrays 56A" and 56B" which are mounted on frame 86 in proximity with the inner face of belt 90'. The two images are read and the belt is erased by drums 98 and 100 in a coordinated one-step operation as the information is stored in the storage means for further processing or use.

Instead of utilizing the secondary grid 96 mounted separately on frame 86 in front of the dielectric sheet 90, the improved embodiment of FIG. 13 utilizes a secondary grid 96' which is deposited directly on the inner dielectric surface of belt 90'. FIG. 15 shows, in amplified detail, the surface of a portion of belt 90' with the conductive elements 96 of the secondary grid directly deposited on the inner surface of belt 90' on the opposite side of the belt from the conductive back portion 91. In operation, the potential between the conductive grid 88 and the conductive back plate 91 of belt 90' is approximately 2000 volts with a potential maintained between the secondary grid and the back plate of approximately 100 volts. The seconday grid 96 produces a potential distribution indicated by dotted lines 101 in FIG. 14, thus preventing a charge build-up on the dielectric layer from repelling incoming charged particles and deflecting them off their ballistic path. A charged particle is shown on its trajectory 97 in FIG. 14. A deflection due to charge build-up would result in an undesirable defocussing of the image. The secondary grid also acts to provide a drain for excess charge build-up on the dielectric surface in the event of high intensity flow of charged particles. Excessive charge build-up can cause blooming of the x-ray image and a resultant loss of detail.

The net effect of applying the secondary grid 96 to the surface of the dielectric medium is to linearize the exposure versus charge relationship until the surface potential is equal to the voltage maintained on the secondary grid, at which point the charge versus exposure characteristic becomes flattened with virtually no further increase in the charge deposited on the dielectric after this threshold is reached. This prevents the common and undesirable blooming effects in prior art x-ray devices where high intensity radiation passing around a small object being x-rayed, for example, "blooms" and obliterates all detail in the perimeter of the object being illuminated. In prior art systems, it was necessary to use water bags and other techniques to reduce the difference in transmissibility to x-ray radiation between the object being illuminated and the background. The improved linearity and sharp cut-off of the exposure characteristics avoids the need of taking precautions to avoid large density differences between the object to be x-rayed and the background.

What is claimed is:

1. A method for forming a two-dimensional diagnostic x-ray shadowgram comprising:

placing the subject between a mono-energetic x-ray source and a gas ionization chamber x-ray detector;

matching the energy of the x-ray source and that of the detector ionization gas so that the x-rays produced by the source have an energy level just above an absorption edge of the gas;

irradiating the subject with x-rays from the x-ray source;

detecting the x-ray shadow image in the gas ionization chamber; and electronically processing the detected image information to produce a visible shadowgram.

2. The method as in claim 1 wherein the ionizing gas is Xenon and the x-ray source is a Praesodymium anode.

3. The method as in claim 1 wherein the ionizing gas is Krypton and the x-ray source is a Yttrium anode.

4. The method as in claim 1 wherein the ionizing gas is a gaseous Erbium compound and the x-ray source is a Tungsten anode.

5. A method as in claim 1 further comprising matching a second x-ray source and a second detector gas absorption edge so that the x-rays produced by the second source have an energy level just above the second gas absorption edge, irradiating the subject with x-rays from the second x-ray source, and, detecting the second x-ray shadow image in the gas ionization chamber; and wherein said image formation processing step includes comparing the x-ray shadow image information obtained from the successive subject irradiations so as to produce a visible image contrasting the successive x-ray shadow images.

6. The method as in claim 5 wherein said first x-ray source is a Praesodymium anode, said second x-ray source is a Yttrium anode, said first detector gas is Xenon and said second detector gas is Krypton.

7. A method as in claim 5 wherein said first detector gas absorption edge is the k edge of Xenon and said second detector gas absorption edge is the l edge of Xenon.

8. A gas ionization chamber suitable for detecting x-rays comprising:

a gas-tight container having an x-ray penetratable window therein;

a wire harp within the container comprising a frame defining an opening aligned in generally parallel planar relationship with the window and a plurality of closely spaced substantially parallel fine wires carried by the frame within the frame opening;

a generally planar sheet of insulating material aligned in substantially parallel planar relationship with the harp, said sheet having a first insulating surface within the container facing the harp and an opposing second surface; and means for applying a positive electrical potential to the wires relative to the second surface of the insulating sheet.

9. An ionization chamber as in claim 8 wherein said means for applying a positive potential includes:

a generally planar conductive sheet positioned adjacent to and aligned with the second surface of said sheet of insulating material; and a source of electrical potential connected to establish a positive potential between the wires of said harp and said conductive sheet.

10. The ionization chamber as in claim 9 wherein said conductive sheet is a metallic backing on said sheet of insulating material.

11. The ionization chamber as in claim 10, also including secondary grid means maintained at a positive potential relative to said second surface which is substantially lower than the positive potential of said wire harp relative to said second surface of said sheet of insulating material, said secondary grid positioned in close proximity to said first insulating surface for producing a potential distribution on said first insulating surface thereby preventing charge build-up on said first insulating surface.

12. The ionization chamber as in claim 11 wherein said secondary grid means is comprised of a plurality of conductive strips bonded to said first insulating surface.

13. The ionization chamber as in claim 12 wherein said secondary grid means is maintained approximately 100 volts above the potential of said second surface while said wire harp is maintained at a potential of approximately 2000 volts above said second surface.

14. An ionization chamber as in claim 9 wherein the insulating sheet comprises a wall of the container opposite the x-ray penetratable window and the insulating sheet is made of a material transparent to ultraviolet light.

15. A chamber as in claim 14 wherein the insulating sheet is quartz and is 10 mils thick or less.

16. A chamber as in claim 9 in association with means for sensing the potential distribution created on said insulating sheet first surface by ions immobilized on said sheet when the container is filled with ionizing gas, a positive potential relative to the conductive sheet is applied to the wires, and x-ray photons entering the container are absorbed by atoms of said gas.

17. A chamber as in claim 8 including means for returning the first surface of said insulating sheet to a substantially uniform potential after sensing the potential distribution thereon with said means for sensing.

18. A chamber as in claim 17 wherein said means for returning the first surface of said insulating film to a uniform potential applies a conductive plasma to the first surface of said sheet of insulating material.

19. A chamber as in claim 17 wherein said means for returning the first surface of said insulating sheet to a uniform potential includes a roller having a conductive coating thereon and means for introducing relative movement between the conductive coating of the roller and the first surface of said sheet of insulating material.

20. A chamber as in claim 17 wherein said means for returning the first surface of said insulating sheet to a uniform potential includes a source of ultraviolet energy to apply ultraviolet fluid to the first surface of said sheet of insulating material through said sheet of insulating material.

21. A chamber as in claim 16 wherein said potential sensing means comprises:

- guide members defining a plane between said wire frame and said insulating sheet;
- a slidable transverse bar extending between and carried on said guide members;
- a plurality of uniformly spaced capacitance sensing plates mounted on said bar facing the first surface of said insulating sheet;
- drive means for introducing relative motion between the bar and the surface of the insulating sheet; and
- amplifying means operatively connected to said plates for separately sensing the charge on the first surface of said sheet of insulating material as relative motion between the bar and the first surface of said insulating sheet occurs.

22. A chamber as in claim 21 wherein said means for establishing a uniform potential is fixed relative to said bar.

23. A chamber as in claim 16 further comprising:

- a second insulating sheet within said container on the opposite side of said wire harp from said first insulating sheet, said second sheet having a conductive backing on one side thereof, the other side of said second sheet facing the wire frame;
- second capacitance sensing means for sensing a potential distribution on said second insulating sheet;
- second means for returning other side of said second insulating sheet to a uniform potential; and wherein said means for applying an electrical potential to said first insulating sheet includes means for maintaining said conductive layer of said second insulating sheet at the potential of the wires when a relatively negative potential is applied to the conductive layer of said first insulating sheet, and means for applying a relatively negative potential to the conductive layer of said second insulating sheet while maintaining the conductive layer of said first insulating sheet at the potential of the wires.

24. A diagnostic x-ray detector comprising:

- a sealable container having an x-ray penetratable window therein;
- means for introducing an ionization gas into the container;
- an insulating frame mounted in said container, defining an opening in parallel planar alignment with the window;
- a pair of electrically conductive plates aligned parallel to said frame, said plates disposed on opposite sides of said frame in said container;
- a plurality of substantially parallel closely spaced high resistance wires carried in said frame;
- means for applying a negative potential to said plates relative to said wire; and
- electronic read-out means operatively connected to each of said wires for determining the location of gas atom ionizing events occurring along said wires, said read-out means including means for integrating the gas ionizing event information in parallel from each said wire and providing thereby two-dimensional x-ray shadow information.

25. A detector as in claim 24 wherein said electronic read-out means includes means for determining the location of the gas ionizing event along a wire by comparing the time for a charge on the wire resulting from said event to reach the opposite ends of the wire.

26. An apparatus for producing diagnostic x-ray shadowgrams comprising a mono-energetic x-ray source and a gas ionization detector having a gas filling ionizable by x-ray photons, the first absorption edge of said detector gas and the energy level x-ray source being matched so that the x-ray source produces photons of an energy just above an absorption edge of the gas.

27. An apparatus as in claim 26 wherein the x-ray source is a Praesodymium anode and the detector gas is Xenon.

28. An apparatus as in claim 26 wherein the x-ray source is a Yttrium anode and the detector gas is Krypton.

29. An apparatus as in claim 26 having a plurality of x-ray sources having energies matching a plurality of detector gas absorption edges.

30. An apparatus as in claim 29 wherein the detector contains a mixture of ionizable gases having different absorption edges.

31. an apparatus as in claim 29 wherein the x-ray sources are matched to different absorption edges of the same ionizing gas.

32. An apparatus as in claim 29 wherein a plurality of x-ray sources are mounted on a rotatable turret for simplifying changing from one x-ray source to another.

33. An apparatus as in claim 26 wherein the detector comprises:
- a gas-tight container having an x-ray penetratable window therein;
- a wire harp within the container comprising a frame defining an opening aligned in generally parallel planar relationship with the window and a plurality of closely spaced substantially parallel fine wires carried by the frame within the frame opening;
- a generally planar sheet of insulating material aligned in substantially parallel planar relationship with the harp, said sheet having a first insulating surface within the container facing the harp and an opposing second surface; and
- means for applying a positive electrical potential to the wires relative to the second surface of the insulating sheet.

34. Apparatus as in claim 33 wherein said means for applying a positive potential includes:
- a generally planar conductive sheet positioned adjacent to and aligned with the second surface of said sheet of insulating material; and
- a source of electrical potential connected to establish a positive potential between the wires of said harp and said conductive sheet.

35. Apparatus as in claim 34 wherein said conductive sheet is a metallic backing on said sheet of insulating material.

36. Apparatus as in claim 35, also including secondary grid means maintained at a positive potential relative to said second surface which is substantially lower than the positive potential of said wire harp relative to said second surface of said sheet of insulating material, said secondary grid positioned in close proximity to said first insulating surface for producing a potential distribution on said first insulating surface thereby preventing charge build-up on said first insulating surface.

37. Apparatus as in claim 36 wherein said secondary grid means is comprised of a plurality of conductive strips bonded to said first insulating surface.

38. Apparatus as in claim 37 wherein said secondary grid means is maintained approximately 100 volts above the potential of said second surface while said wire harp is maintained at a potential of approximately 2000 volts above said second surface.

39. An apparatus as in claim 26 wherein the detector comprises:
- a sealable container having an x-ray penetratable window therein;
- means for introducing an ionization gas into the container;
- an insulating frame mounted in said container defining an opening in parallel planar alignment with the window;
- a pair of electrically conductive plates aligned parallel to said frame, said plated disposed on opposite sides of said frame in said chamber;
- a plurality of substantially parallel closely spaced highly resistant wires carried in said frame;
- means for applying a negative potential to said plates relative to said wire; and
- electronic read-out means connected to each of said wires for determining the location of a gas atom ionizing event along said wire, said read-out means including means for integrating the gas ionizing event information from each said wire to provide twodimensional x-ray shadow information.

40. An apparatus as in claim 26 wherein said gas ionization detector comprises:
- a sealable container having an x-ray penetratable window therein, the sealable container having mounted therein:
  - a frame defining an opening aligned with the window;
  - a plurality of closely spaced, substantially parallel fine wires carried by the frame within the frame opening;
  - first and second insulating sheets disposed on opposite sides of said frame, each having one side thereof backed with an electrically conductive material, said insulating sheets aligned with said frame so that the insulating sides thereof face said frame and the planes defined by the sheets are generally parallel to the planes defined by the frame and the window;
  - means for sequentially applying a positive electrical potential to the wires relative to the conductive back of said first or said second sheet;
- further means for sequentially applying electrical potential to the conductive surfaces of said second and said first insulating sheets to maintain one said sheet at a relatively negative potential with respect to the wires when the other sheet is at a positive potential;
- means for sensing the potential distribution created on said first insulating sheet by ions immobilized on said sheet when the container is filled with ionizing gas, a positive potential is applied to the wires and to said second sheet, a relatively negative potential is applied to the conductive layer of said first insulating sheet, and x-ray photons entering the container are absorbed by atoms of said gas; and
- means for establishing a uniform potential across said first insulating sheet after sensing the charge thereon.

41. An apparatuss as in claim 40 wherein said capacitance sensing means comprise for each said insulating sheet:
- a pair of guide members extending between said wire frame and said insulating sheet;
- a slidable transverse bar extending between and carried on said guide members;
- a plurality of uniformly spaced capacitance sensing plates mounted on said bar facing the insulating side of said insulating sheet;
- drive means for introducing relative motion between the bar and the surface of the insulating sheet; and
- amplifying means operatively connected to said plates for separately sensing the charge on the first surface of said insulating sheet as relative motion between the bar and the first surface of said insulating sheet occurs.

* * * * *

United States Patent [19]
Gober
[11] Patent Number: 4,558,224
[45] Date of Patent: Dec. 10, 1985

[54] COUNTERFEIT BILL WARNING DEVICE

[75] Inventor: Jerome T. Gober, Chicago, Ill.
[73] Assignee: Imperial Inc., Chicago, Ill.

[21] Appl. No.: 498,635
[22] Filed: May 26, 1983
[51] Int. Cl.$^4$ .................... G01N 21/64
[52] U.S. Cl. .................... 250/461.1
[58] Field of Search .................... 250/271, 372, 458.1, 250/459.1, 461.1, 556; 283/89, 92

[56] References Cited

U.S. PATENT DOCUMENTS

| | | | |
|---|---|---|---|
| 2,950,799 | 8/1960 | Timms | 250/372 |
| 3,842,281 | 10/1974 | Goodrich | 250/461.1 |
| 4,061,922 | 12/1977 | Last | 250/461.1 |
| 4,277,774 | 7/1981 | Fujii et al. | 250/372 |

*Primary Examiner*—Alfred E. Smith
*Assistant Examiner*—Vincent J. Lemmo
*Attorney, Agent, or Firm*—Leydig, Voit & Mayer, Ltd.

[57] ABSTRACT

According to the invention, a device for detecting counterfeit paper currency is provided which utilizes the characteristic fluorescence of genuine paper currency to detect counterfeit paper currency. An ultraviolet lamp illuminates the paper currency of unknown origin which the currency is placed on a stage held in fixed relationship to the ultraviolet lamp by a housing. A sensor circuit responds to the fluorescent radiation from the paper currency to give a signal to an indicator which displays an indication of the fluorescence of the unknown paper currency relative to genuine paper currency. The sensor is a photoresistor and the indicator is a variable intensity light or a digital display.

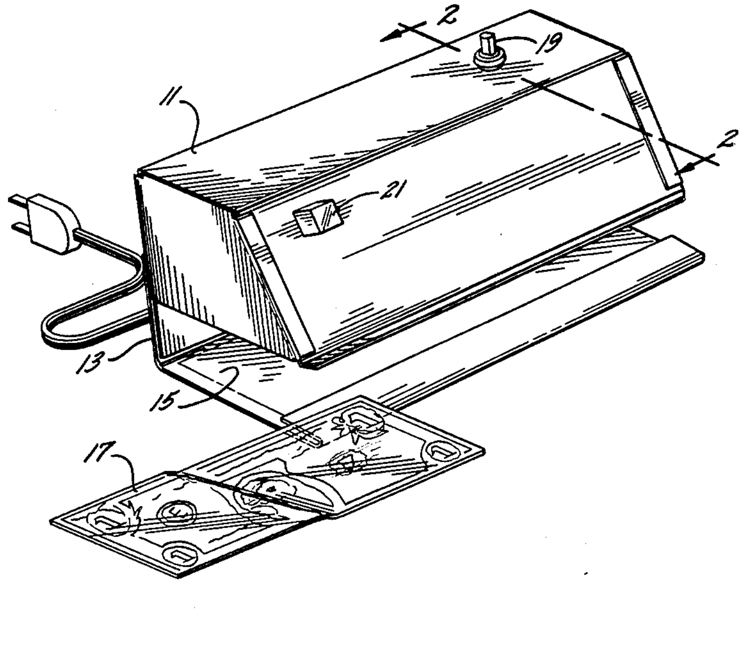

12 Claims, 4 Drawing Figures